3,296,024
POLYESTER COATINGS FOR INSULATED ELECTRICAL CONDUCTORS

Manuel A. Jordan and John F. Meyer, Schenectady, N.Y., assignors to Schenectady Chemicals, Inc., Schenectady, N.Y., a corporation of New York
No Drawing. Filed Dec. 6, 1962, Ser. No. 242,655
10 Claims. (Cl. 117—218)

This invention relates to insulated electrical conductors. More particularly, this invention relates to improved polyester coatings for such conductors.

It is known to prepare wire enamels including products attained by reacting an aromatic dicarboxylic acid, e.g., terephthalic acid or isophthalic acid, or ester-forming derivatives thereof (including half-esters) such as the lower alkyl esters, e.g., those formed from methyl, ethyl, propyl, butyl, amyl, hexyl or heptyl alcohols or from phenol or its homologues with a glycol, including ethylene glycol, trimethylene glycol, tetramethylene glycol, pentamethylene glycol, hexamethylene glycol and even higher glycols, or ester-forming derivatives thereof, e.g., esters with low molecular weight carboxylic acids.

In copending application Serial No. 58,198, filed September 26, 1960, and now Patent No. 3,141,859 and entitled Wire Coating for Coated Electrical Conductors, it is proposed to coat an electrical conductor from a dispersion of a linear polyester as described above, e.g., polyethylene terephthalate, in a solvent comprising a chlorophenol, e.g., o - chlorophenol, m - chlorophenol and p - chlorophenol; an alkylated chlorophenol, such as p - chloro-m - cresol, 4 chloro - sec. butyl phenol and p - chlorothymol; or a mixture of these chlorophenols; a cresol, e.g., o-cresol, m-cresol, p-cresol, cresylic acid and a mixture of m-cresol and p-cresol; and phenol. For all or a portion of the phenol can be substituted one of the cresols or a mixture thereof.

Among the preferred solvent compositions are those containing one each of the groups of chlorophenols and cresols together with phenol, e.g., p-chlorophenol, o-cresol and phenol. Another preferred solvent mix comprises p-chlorophenol and cresylic acid, while a third preferred mix contains p-chlorophenol and m-p-cresol. The preferred chlorophenol is p-chlorophenol and the preferred cresol is o-cresol.

As previously stated, the solvent employed may include cresylic acid. Generally, the cresylic acid has a boiling range of 189° to 220° C. Cresylic acid is defined in Bennett's Concise Chemical and Technical Dictionary (1947), as a mixture of o-, m-, and p-cresols having a boiling range of 185° C. to 230° C.

As also previously stated, in place of all or a portion of the phenol, the individual cresols, e.g., o-, m-, or p-cresol, or a mixture thereof, e.g., m-p-cresol or cresylic acid, can be employed, but it is preferred to include phenol in the solvent mix. When dissolving a polyester in the preferred solvent mixture the chlorophenol may be employed in the range of 30 to 50%, based on the weight of the total solvent, the phenol in the range of 25 to 50% and the cresol in the range of 10 to 35%. If, as stated previously, a cresol is substituted for the phenol, the total cresol may be employed up to 70%.

It has also been found that with the use of the above solvent mixtures, solutions of the polymeric linear esters can be prepared which contain up to 21% solids content, and which remain stable for increased periods of time. The preferred range of solids content is between about 13% and 18% for solutions to be used for applying wire enamel, a solution containing a solids content of about 15% remaining stable for a year or more.

Formation of these polyesters is set forth in the aforementioned copending application Serial No. 58,198, and said application is incorporated herein in its entirety.

It has been found desirable that enamel coated wire pass certain tests in order to be suitable for use at elevated temperatures for extended periods of time. Enameled wire prepared from the above compositions was tested and displayed distinctly superior qualities as shown by the following results:

(a) Dielectric strength (A.S.T.M. test D-149, short time) of wire coated with the instant product—2,600 volts per mil; whereas wire coated with polyamid type enamels shows at the same test only about 1200–1400 volts per mil dielectric strength.

(b) Scrape abrasion test (NEMA Magnet Wire Standards MW 24–25, edition November 1946) 25–35 strokes with a 700 gm. weight; whereas polyamid type enamel coated wire under the same conditions will pass only 15–20 strokes.

(c) Heat aging test (NEMA Standards MW 24–40). The coated wire will pass winding around its 3 times diameter without cracking or crazing after 45 days aging at 125° C. (NEMA Standards requirement 8 days); whereas polyamid type enamel coated wire under the same conditions will fail on the same 3 times diameter winding after 7 days aging at 125° C.

Similarly, in our copending application Serial No. 235,148, filed November 2, 1962, now abandoned, and entitled Polyester Resin and Electrical Conductor Coated Therewith, there are disclosed improved polyester coatings for electrical conductors comprising the reaction product of a polyhydric alcohol having at least three hydroxyl groups, such as glycerine, pentaerythritol, 1,1,1-trimethylolethane, 1,1,1 - trimethylolpropane, sorbitol, mannitol, dipentaerythritol, diglycerol, etc., or mixtures of these alcohols together with neopentyl glycol and terephthalic acid or isophthalic acid or acyl halides thereof, e.g., terephthalic acid dichloride, or a lower dialkyl ester thereof, e.g., methyl, ethyl, propyl, butyl, amyl, hexyl and octyl terephthalates and the corresponding isophthalates as well as the half esters, e.g., monomethyl terephthalates, as well as mixtures of such esters and acids or acid halides. Neopentyl glycol is designated chemically at 2,2-dimethyl 1,3 propanediol and has the structural formula:

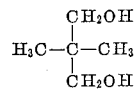

A portion of the neopentyl glycol can be replaced by ethylene glycol so that of the total alkanediol present 20 to 100 weight percent of the glycol is the neopentyl glycol and the balance is ethylene glycol. Similarly, a portion of the neopentyl glycol can be replaced by a straight-chain α,ω aliphatic hydrocarbon diol having 4 to 5 carbon atoms, e.g., butanediol-1,4; pentanediol-1,5; butene-2-diol-1,4 and butyne-2-diol-1,4. When using a mixture of alkanediols usually 0 to 80% is ethylene glycol.

Among the preferred compositions are those containing no ethylene glycol. Another preferred group of compositions are those wherein on a mol basis about 62% of the dihydric alcohol is neopentyl glycol or a mixture of a straight-chain α,ω aliphatic hydrocarbon diol having 4 to 5 carbon atoms and neopentyl glycol and about 38% of the dihydric alcohol is ethylene glycol. Any substantial variation in this ratio results in a marked reduction in properties such as heat shock and thermal aging. This is true, for example, in products which are relatively low in glycerine (except for those products wherein substantially 100% of the dihydric alcohol is neopentyl glycol). At the lower end of the range for the glycerine component, there is a significant increase in the stability of compositions employing a mixture of the neopentyl glycol and ethylene glycol in contrast to ethylene glycol alone.

The preferred polyhydric alcohols having at least three carbon atoms are glycerine and pentaerythritol and the preferred phthalic compound is dimethyl terephthalate.

The transesterification reaction and polymer formation between the dialkyl terephthalate, polyhydric alcohol having at least three hydroxyl groups and aliphatic hydrocarbon diol can be carried out in the absence of a solvent, but preferably a high boiling naphtha is present as a solvent. The naphtha may be diluted with xylol or one of the individual xylenes. While it is not essential to use an esterification catalyst, it is frequently desirable to do so. Conventional catalysts such as hydrochloric acid, toluene sulfonic acid, litharge, lead acetate, zinc oxide, ferric acetate, etc., can be used. The preferred catalyst is litharge.

For each 776 parts (4 mols) of dimethyl terephthalate there are employed sufficient alcohol, i.e., aliphatic hydrocarbon diol and polyhydric alcohol having at least three hydroxyl groups, to provide at least about 1 hydroxyl group for each carboxyl (COOH) group. Preferably, there are present a total of 1.0 to 1.6 hydroxyl groups on the alcohols for each carboxyl group on the terephthalic acid or derivative thereof.

Generally, from 25 to 75% of the total alcohol by weight has at least three hydroxyl groups and the balance, or 75 to 25% by weight, is aliphatic hydrocarbon diol.

Another way of expressing the percentages of the various materials used as reactants is in equivalent percent. Generally, there is 25 to 62 equivalent percent of the terephthalic acid derivative, e.g., dimethyl terephthalates; 13 to 46 equivalent percent of the aliphatic hydrocarbon diol, e.g., neopentyl glycol; and 13 to 46 equivalent percent of the aliphatic polyhydric alcohol having at least three hydroxyl groups, e.g., glycerine; of the aliphatic hydrocarbon diol 20 to 100% by weight is neopentyl glycol or a mixture thereof with an $\alpha,\omega$ aliphatic hydrocarbon diol having 4 to 5 carbon atoms and the balance, i.e., 80 to 0% by weight is ethylene glycol. The term equivalent percent has been defined in the literature as the number of equivalents of a particular reactant divided by the total number of equivalents of all reactants times 100.

Pentareythritol can be used in pure form or as a commercial mixture such as a mixture of 90% pentaerythritol and 10% dipentaerythritol, commercially available as Pentek. The pentaerythritol can be used to replace the glycerine in whole or in part. Account should be taken in such replacement of the additional hydroxyl group available on pentaerythritol.

It has been further found that the addition of small amounts of zinc, lead, calcium or cadmium compounds materially improves the abrasion properties of the enamel. There can be used the usual zinc, lead, calcium or cadmium driers, such as the linoleates, octoates and resinates of each of these metals, e.g., zinc resinate, cadmium resinate, lead linoleate and calcium linoleate. Likewise, there can be employed the naphthenates, specifically zinc naphthenate, lead naphthenate, calcium naphthenate, and cadmium naphthenate.

Other metal driers, specifically polyvalent metal driers, such as manganese naphthenate and cobalt naphthenate, can also be employed, although zinc octoate is preferred.

The metal compound is preferably used in an amount between 0.1% and 2.0% metal based on the total solids of the enamel.

Formation of these polyesters is set forth in our co-pending application Serial No. 235,148, and said application is incorporated herein in its entirety.

The enamels, both with and without the addition of the metal drier, have outstanding resistance to high temperatures, thus enabling them to be used as Class B insulation.

It has been found desirable that enamel coated wire pass certain tests in order to be suitable for use at 135° C. for an extended period of time. The enameled wires prepared from the above compositions containing neopentyl glycol were tested and passed all of these tests. The tests themselves are described in Belgian Patent 543,486. In view of the use of neopentyl glycol and straight-chain aliphatic hydrocarbon diols having 4 to 5 carbon atoms, the high cut-through temperatures are especially surprising.

While enamels incorporating esters of neopentyl glycol exhibit exceptionally good resistance to high temperatures, the heat shock and abrasion characteristics are satisfactory but not outstanding.

It is therefore an object of this invention to provide improved coatings for electrical conductors.

It is another object of this invention to provide coatings for electrical conductors which exhibit exceptionally good heat shock and abrasion characteristics.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the foregoing objects can be attained by applying an undercoat of a wire enamel comprising a polymeric ester of a polycarboxylic acid of the group consisting of terephthalic acid and isophthalic acid and a polyhydric alcohol having at least three hydroxyl groups, or a mixture of such alcohols, together with neopentyl glycol, and by applying an overcoat of a linear polyester formed by the reaction of an aromatic dicarboxylic acid and a glycol, e.g., polyethylene terephthalate.

The specific properties which show marked improvement are abrasion resistance and heat shock. Generally, heat shock is improved such that the overcoated wire will at least pass the same mandrel after 13.5% stretch as the undercoated wire will pass without a 13.5% stretch. The abrasion resistance characteristics are improved such that a 10–20% improvement in abrasion resistance is noted with use of the overcoat.

The solution for the undercoat, i.e., the polymeric terephthalic acid ester in naphtha and cresylic acid, with or without the xylol, can be applied to wire, e.g., copper wire, by either of two methods conventionally employed in the wire enameling art. For example, it can be reduced in viscosity and solids content by using cresylic acid or a mixture of cresylic acid and EW naphtha and run by the "free dip" method. In this method, the resin solution is thinned to a viscosity of about 50 to 100 centipoises, or less, at 25° C. and the copper wire run over a pair of half-submerged pulley wheels in a tank containing the thinned solution. Alternatively, the polyester can be used at a viscosity of 4000 to 5000 centipoises (25° C.) and used as a die application wire enamel. The resin solution also runs very well by the die application at 50 to 100 centipoises. The wire coated in either of these processes is then baked above the boiling point of the solvent, e.g., 350° C. to 450° C. to complete the polymerization of the resin and to remove the solvent. Wire speeds of 18 to 40 feet/minute can be employed.

The polyester compositions for the overcoat are dispersed in solvents and are applied to the conductor already carrying the undercoat by either of the two conventional methods described above. For example, in the "free dip" method, the polyester solution at its original strength is kept at room temperature in a tub, and the conductor passes in a vertical direction through the tub, picking up enamel as it passes therethrough. In the die application method also the resin solution is placed in a tub at room temperature and at original strength. The conductor passes through the tub picking up enamel and is then squeezed in its vertical movement through the dies which allow only a certain amount of coating to remain thereon, the excess being stripped off by the narrow crevice of the die.

The wire coated in either of these processes is then baked in a wire enameling tower at temperatures above the boiling point of the solvent mixture, e.g., 120° to 425° C., to complete the polymerization of the resin in the overcoat and to remove the solvent therefrom. Wire speeds of 15 to 30 feet/minute, and preferably of 23 to 27 feet/minute, can be employed. The entering temperature of the tower is about 120° C., increasing through the length to about 350° to 425° C. at the point of exit. The elevated temperature causes the solvent to be driven off, and as the wire travels into the higher temperature region, the polyester composition fuses onto the previously coated wire. Additional coats, if necessary, are applied by subsequent passing and baking until the desired build (i.e., the total increase in diameter over the bare wire diameter) is acquired. In the present invention the undercoat of the neopentyl glycol polyester is built up to a build between 0.0020″ and 0.0040″, preferably between 0.0025″ and 0.0035″ on #18 wire. The overcoat of the polyester of an aromatic dicarboxylic acid and a glycol is built up to a build between 0.0002″ and 0.0010″ and preferably between 0.0003″ and 0.0007″, making an overall build of the coating between 0.0022″ and 0.0050″ and preferably between 0.0027″ and 0.0042″.

In the following examples and throughout the specification and claims, all parts are parts by weight unless otherwise specified.

*Example 1*

| Material | Pounds (Unless Otherwise Noted), gms. | Equivalent | Equivalent, percent |
|---|---|---|---|
| Dimethyl terephthalate | 233 | 2.41 | 45.3 |
| Glycerine (96%) | 42.5 | 1.33 | 25.0 |
| Neopentyl glycol | 39 | .765 | 14.39 |
| Butanediol 1,4 | 10.25 | .228 | 4.29 |
| Ethylene glycol | 18.25 | .59 | 11.1 |
| Solvesso 100 | 45 | | |
| Xylol | 15 | | |
| Litharge | 23 | | |

The above materials were charged into a stainless steel electrically heated kettle of 75 gallons capacity equipped with agitator, thermocouple and a distillation column. Heat was applied to the kettle and the temperature of the batch was raised slowly and uniformly over a period of 27 hours to a temperature of approximately 190° C. The batch was held at this temperature until a sample reduced to 40% solids with cresylic acid showed a viscosity of Z4½. At this time heating was discontinued and 330 pounds of cresylic acid added to the kettle while the batch was still hot. Just prior to addition of cresylic acid, a small hard sample of the batch had a hydroxyl value of 100. The yield of material was approximately 615 pounds. To 1000 grams of the material was added 625 grams Solvesso 100, 42 grams cresylic acid, 16.68 grams tetraisopropyl titanate and 4.6 grams zinc octoate. This was agitated until a uniform solution was obtained.

*Example 2*

| | Grams |
|---|---|
| Polyethylene terephthalate | 170 |
| p-Chlorophenol | 332 |
| o-Cresol | 166 |
| Phenol | 332 |

The mixture was heated to a temperature of about 220° F. The ester was completely and homogeneously dispersed, the liquid composition having a viscosity of X to Y, 17% solids content and a specific gravity of 1.160.

*Example 3*

To illustrate the improvement in heat shock and abrasion characteristics of the coating of the present invention, a #18 copper wire was coated with enamel prepared according to Example 1 by the die application procedure. The coated wire was thereafter passed through a commercial wire enamel tower at a wire speed of 27 feet per minute at an entering temperature of 118° C. and an exit temperature of 399° C. Six passes of the wire through the solution and tower were employed and the total build up of enamel on the wire was about 0.0032″. A second conductor was similarly coated except that only five passes of the wire through the solution and tower were employed. The conductor was then given an overcoat by a single pass through the solution prepared according to Example 2.

The comparative properties of the conductors according to Example 3 are given in the following table:

TABLE 1

| | Not Overcoated | Overcoated |
|---|---|---|
| Snap test | Pass | Pass. |
| Mandrel after snap | Pass 1X M | Pass 1X M. |
| Abrasion (unidirectional) | 1,203 g | 1,456 g. |
| Heat shock (no prestretch):[1] | | |
| 1X Mandrel (percent pass) | 0 | |
| 2X Mandrel (percent pass) | 30 | |
| 3X Mandrel (percent pass) | 30 | |
| Heat shock (13.5% prestretch:[1] | | |
| 1X (percent pass) | | 0. |
| 2X Mandrel (percent pass) | | 50. |
| 3X Mandrel (percent pass) | | 80. |
| Boiling 50/50 alcohol/toluol | Pass | Pass. |
| Build of undercoat | 0.0032″ | 0.0027″. |
| Total build | | 0.0032″. |

[1] Figures are percent of test specimens which pass the indicated mandrel.

We claim:

1. An electrical conductor provided with a first continuous coating of the polymeric ester of an acid selected from the group consisting of terephthalic acid and isophthalic acid with a mixture of polyhydric alcohols consisting of (a) 25 to 75% by weight of a saturated aliphatic polyhydric alcohol having at least three hydroxyl groups and (b) 75 to 25% by weight of an aliphatic hydrocarbon diol wherein from 20 to 100% of said diol is a member selected from the group consisting of neopentyl glycol and a mixture of neopentyl glycol with a straight-chain $\alpha,\omega$ aliphatic hydrocarbon diol having four to five carbon atoms and the balance of the diol is ethylene glycol, and a second continuous coating of linear polymeric polyethylene terephthalate.

2. A conductor as in claim 1 wherein the total number of hydroxyl groups on the alcohol reactant for the first of said coatings is from 1 to 1.6 times the total number of carboxyl groups of the acid reactant.

3. An electrical conductor as in claim 2 wherein the ester of an acid is an ester of terephthalic acid.

4. An electrical conductor as in claim 3 wherein the polyhydric alcohol containing at least three hydroxyl groups is glycerine.

5. An electrical conductor as in claim 3 wherein the polyhdric alcohol containing at least three hydroxyl groups is pentaerythritol.

6. An electrical conductor as in claim 3 wherein the diol is all neopentyl glycol.

7. An electrical conductor as in claim 6 wherein the polyhydric alcohol is glycerine.

8. An electrical conductor as in claim 3 wherein the diol comprises ethylene glycol, neopentyl glycol and butanediol 1,4.

9. An electrical conductor as in claim 3 wherein the diol includes both ethylene glycol and neopentyl glycol.

10. An electrical conductor as in claim 9 wherein the polyhdric alcohol having at least three hydroxyl groups is glycerine.

References Cited by the Examiner

UNITED STATES PATENTS

| | | | |
|---|---|---|---|
| 2,889,304 | 6/1959 | Sheffer et al. | 260—33.4 |
| 2,894,934 | 7/1959 | Burkhard | 260—75 |
| 2,936,296 | 5/1960 | Precopio et al | 260—33.4 |
| 3,022,200 | 2/1962 | Koerner et al. | 117—218 |
| 3,054,703 | 9/1962 | Brasure | 260—75 |
| 3,055,867 | 9/1962 | Le Bras et al. | 260—75 |
| 3,055,869 | 9/1962 | Wilson et al. | 260—75 |
| 3,153,005 | 10/1964 | Minter | 260—75 X |
| 3,201,276 | 8/1965 | Meyer et al. | 117—232 |
| 3,240,626 | 3/1966 | Olson et al. | 117—218 |

ALFRED L. LEAVITT, *Primary Examiner.*

WILLIAM L. JARVIS, *Examiner.*